3,190,379
AUGER TOOTH WITH SIDE EDGE BLADE
William M. Troeppl, Santa Clara, and Gerald A. Petersen, Sunnyvale, Calif., assignors, by direct and mesne assignments, of one-half to Gerald A. Petersen, Santa Clara, Calif., and one-half to Anita E. Petersen, Saratoga, Calif.
Filed Oct. 21, 1963, Ser. No. 317,540
6 Claims. (Cl. 175—385)

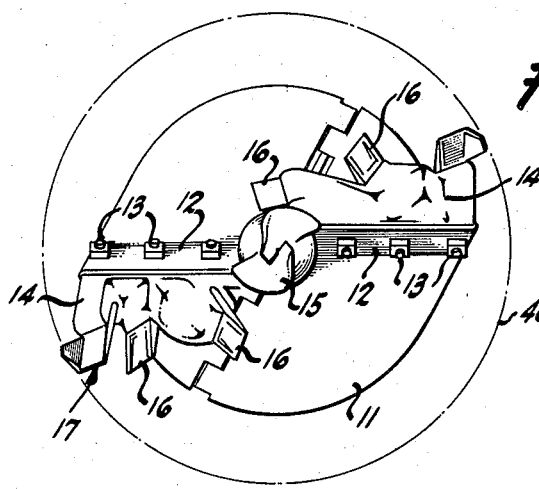
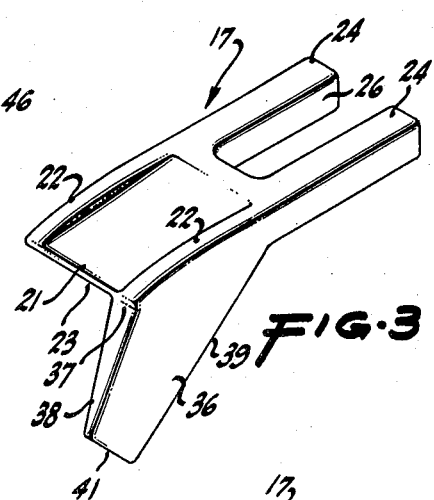
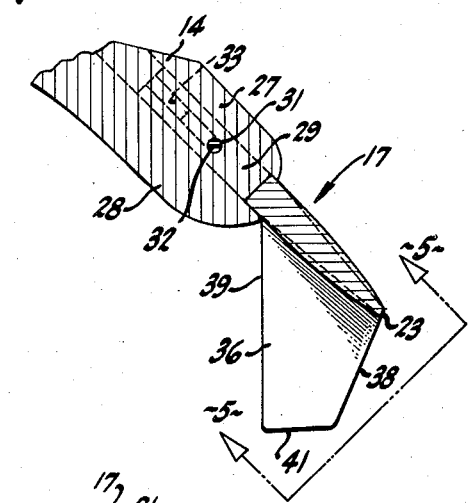
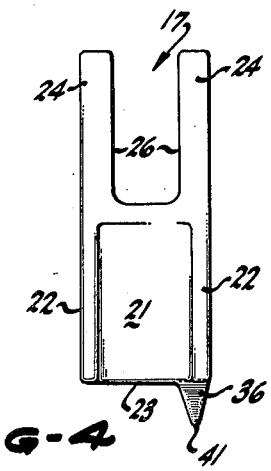
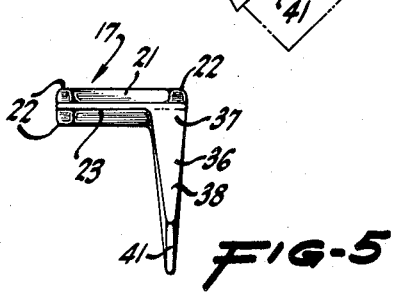
INVENTORS
GERALD A. PETERSEN
WILLIAM M. TROEPPL
BY
ATTORNEY United States Patent Office 3,190,379
Patented June 22, 1965

This invention relates to a new and improved auger tooth with side edge blade. More particularly, the invention relates to a tooth installed on an auger at the outer edge thereof, having a side edge blade to cut clearance in a hole being dug and also to dislodge any rocks or similar obstructions encountered during the digging operation.

The present invention is intended for use on augers of which a representative type is Petersen Patent No. 2,578,014. Such an auger is used to dig holes for utility poles, footings for transmission towers and similar purposes. A plurality of replaceable teeth is located on either side of the central axis of rotation of the auger, the number and spacing of said teeth being subject to considerable variation. The type of teeth used and the manner in which said teeth are held in the auger head is also subject to considerable variation, but a preferred form of tooth to which the present invention is adapted is Petersen Patent No. 2,968,880.

It is a principal object and advantage of the present invention to provide formed integrally or welded to the tooth a side edge blade extending downwardly at right angles to the plane of the tooth so located that the side blade is approximately tangent to the wall of the hole being dug. The forward edge of the side blade is cut away at an angle so that the main part of the tooth performs a major portion of the digging operation, but the side blade cleans out the side of the hole to provide a clean side wall.

A further important feature of the side blade is to facilitate dislodging rocks and other obstructions which are located in the path of the outer tooth. The side blade functions as the auger rotates to dislodge the obstructions or, if the obstructions are too large or too firmly imbeded for dislodgment in such manner, the auger may be raised and during the raising operation the side blade facilitates prying the obstruction out of the surrounding earth.

Other objects of the present invention will become apparent upon reading the following specification and referring to the accompanying drawings in which similar characters of reference represent corresponding paths in each of the several views.

In the drawings:

FIG. 1 is a bottom plan view of an auger in which the present invention is installed.

FIG. 2 is an enlarged fragmentary sectional view through the holder of the tooth and the tooth itself.

FIG. 3 is a perspective view of the tooth.

FIG. 4 is a bottom plan view thereof.

FIG. 5 is an end view as viewed substantially along the line 5—5 of FIG. 2.

The tooth of the present invention is intended for installation on earth augers of the type previously described. Such an auger has a blade 11, provided with radially extending head members 12, to which are bolted by means of bolts 13 tooth holders or shank plates 14. The number, spacing and angular position of the teeth supported by each shank plate 14 is subject to considerable variation. The arrangement shown in FIG. 1 is an adaptation of that shown in Petersen Patent No. 2,578,-014. Associated with each tooth holder 14 is a plurality of teeth 16, there being two such teeth 16 on either side (see FIG. 1). The outermost tooth 17 in FIG. 1 is the subject of the present invention. At the center of the auger a pilot bit 15 may be provided such as that shown in Patent No. 2,639,122.

Reference is made to Petersen Patent No. 2,968,880, showing a tooth with resilient retaining means. In a preferred form of the present invention, a similar retaining means is employed. Thus, in accordance with the present invention the tooth 17 has a main body 21 at the top, which is substantially rectangular in plan having near either side edge thereof a longitudinally extending top and bottom reinforcing ridge 22. The tooth 21 tapers toward a blunt point at the front edge 23, said edge 23 being the leading or cutting edge and performing the cutting operation on the outside of the auger. Rearwardly of the cutting portion of the tooth, are a pair of prongs 24 which are preferably rectangular in cross-section, leaving substantially vertical walls 26. The toothholder 14 has top and bottom transverse member 27, 28, respectively, interconnected by a vertical web 29 of a thickness to fit between the surfaces 26 of prongs 24. The spacing between members 27 and 28 is about equal to thickness of prongs 24. A hole 31 is formed in web 29 to receive a round resilient locking member 32. Rearwardly of hole 31, grooves 33 are formed in the side walls of web 29 to accommodate a portion of the thickness of locking member 32. When the tooth 17 is jammed into the holder 14, the prongs 24 bend locking member 32 backwardly into grooves 33 and compress the insert 32 because its cross-section is greater than the depth of the grooves 33. The compression of insert 32 prevents unintentional dislodgment of the tooth from its socket. The foregoing means of attachment of the tooth to its support is described in detail in said Patent No. 2,968,880. It will be understood that other means may be employed to retain the tooth in its holder.

In accordance with the present invention, there is provided a side edge blade 36 formed integral with or welded to the main body 21. As viewed from the end (FIG. 5), blade 36 is perpendicular to the major portion of tooth 17 and is relatively thin, tapering from its juncture 37 with the main body 21 to its lower edge. As viewed from the side in FIG. 2, the blade is a quadrilateral. The leading edge 38 of side blade 36 forms an angle with the major portion of the tooth 17 of approximately 120° or, in any event is an obtuse angle. The position of tooth 17 shown in FIG. 2 is the preferred position at which the cutting edge 23 of the tooth engages the soil. It will be understood that the leading edge 38 of side blade 36 is disposed angling backward from a vertical line through the edge 23, so that the front edge 23 performs the major portion of the cutting work. The rear edge 39 of blade 36 is approximately vertical as viewed in FIG. 2, forming a buttress to support the leading edge 38. The bottom edge 41 is truncated, being generally perpendicular to edge 39 and horizontal as viewed in FIG. 2. Bottom edge 41 is spaced downwardly from the tooth a sufficient distance to enable the leading edge 38 to perform its clearing and dislodging function. It will further be noted, particularly with reference to FIGS. 3 and 5, that at the juncture 37 of blade 36 with the major portion of the tooth the parts are thickened and curved to resist any tendency to fracture at the juncture.

In use, tooth 17 is positioned as the outermost of the set of teeth on the auger. Blade 36 is tangent to the outside diameter of the hole being dug, as indicated by reference numeral 46 in FIG. 1. As blade 36 turns, it clears out the hole being dug by teeth 16 and the major portion of tooth 17, so as to provide a smooth bore.

A further function of blade 36 is in dislodging rocks which may be in the earth adjacent the outer diameter 46. Dislodgment of such rocks has been a major problem in use of augers of the type heretofore described. The blade 36 itself will usually undermine and cause dislodgment of the rock as the auger turns. However, when this function is not adequately performed, raising the auger upwardly will cause the blade 36 to pry under the rock and dislodge same.

What is claimed is:

1. A tooth having a proximal portion formed with means for attachment to a cooperating tooth-holder and a distal portion, said distal portion having substantially parallel side edges and forwardly converging top and bottom faces terminating in a blunt transverse distal end, said distal portion having along one side edge a depending side edge blade transverse to the general direction of said tooth, said side edge blade being quadrilateral in side elevation, the forward edge of said blade slanting downwardly-forwardly at an obtuse angle to said tooth, the bottom edge of said blade slanting downwardly-rearwardly at an obtuse angle to said forward edge and generally downwardly-rearwardly relative to said tooth.

2. A tooth according to claim 1 in which the rear edge of said blade slants upwardly-rearwardly approximately perpendicular to said bottom edge.

3. A removable and replaceable tooth for earth augers having a proximal portion formed with means for removable attachment to a cooperating tooth-holder and a distal portion, said distal portion having substantially parallel side edges and forwardly converging top and bottom faces terminating in a blunt transverse distal end, said distal portion having along one side edge a depending side edge blade transverse to the general direction of said tooth, said side edge blade having a bottom front corner which as viewed in side elevation is disposed forwardly of a reference plane along said distal end perpendicular to said general direction of said tooth.

4. A tooth according to claim 3 in which the thickness of said blade diminishes toward the bottom.

5. A tooth according to claim 3 in which the length of said blade at its upper end is approximately coextensive with the length of the distal portion of the tooth.

6. An auger having a head extending outwardly to opposite sides of the axis of rotation of said auger and formed with a plurality of tooth holders on each side of said axis, a tooth in each said tooth holder, each said tooth being removable, the outermost tooth on at least one side of said auger having a proximal portion formed with means for removable attachment to a cooperating tooth-holder and a distal portion, said distal portion having substantially parallel side edges and forwardly converging top and bottom faces terminating in a blunt transverse distal end, said distal portion having along one side edge a depending side edge blade transverse to the general direction of said tooth, said side edge blade having a bottom front corner which as viewed in side elevation is disposed forwardly of a reference plane along said distal end perpendicular to said general direction of said tooth, said blade lying on the outermost edge of said auger.

References Cited by the Examiner

UNITED STATES PATENTS

| | | | |
|---|---|---|---|
| 946,060 | 1/10 | Looker | 175—385 |
| 1,415,317 | 5/22 | Crawford et al. | 145—127 |
| 1,522,860 | 1/25 | Boots | 37—142 |
| 1,740,755 | 12/29 | Abramson | 145—127 |
| 2,329,388 | 9/43 | Brown | 175—391 X |
| 2,578,014 | 12/51 | Petersen | 175—392 |
| 2,838,285 | 6/58 | Gredell | 175—413 X |

FOREIGN PATENTS

| | | |
|---|---|---|
| 427,006 | 7/11 | France. |
| 165,572 | 3/50 | Austria. |
| 1,027,217 | 4/58 | Germany. |

CHARLES E. O'CONNELL, *Primary Examiner.*